(12) United States Patent
Podola et al.

(10) Patent No.: US 12,203,787 B2
(45) Date of Patent: Jan. 21, 2025

(54) SYSTEM AND METHOD FOR MEASURING THE AMOUNT OF BACKLASH IN AN ACTUATOR ASSEMBLY

(71) Applicant: HONEYWELL INTERNATIONAL INC., Charlotte, NC (US)

(72) Inventors: David Podola, Brno (CZ); Michal Nozka, Brno (CZ); Radek Hedl, Brno (CZ); Albert Mikan, Prague (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 322 days.

(21) Appl. No.: 17/932,167

(22) Filed: Sep. 14, 2022

(65) Prior Publication Data

US 2024/0085221 A1   Mar. 14, 2024

(51) Int. Cl.
| | |
|---|---|
| *G01D 5/56* | (2006.01) |
| *G01D 5/58* | (2006.01) |
| *G05B 19/401* | (2006.01) |
| *G05B 19/404* | (2006.01) |
| *G05B 19/43* | (2006.01) |
| *F16H 57/01* | (2012.01) |
| *G01M 13/02* | (2019.01) |

(52) U.S. Cl.
CPC ............ *G01D 5/56* (2013.01); *G01D 5/58* (2013.01); *F16H 57/01* (2013.01); *G01M 13/02* (2013.01); *G05B 19/401* (2013.01); *G05B 19/404* (2013.01); *G05B 19/43* (2013.01); *G05B 2219/41032* (2013.01); *G05B 2219/41059* (2013.01); *G05B 2219/41061* (2013.01); *G05B 2219/41068* (2013.01); *G05B 2219/41077* (2013.01)

(58) Field of Classification Search
CPC ........... G05B 2219/41032; G05B 2219/41059; G05B 2219/41077; G05B 2219/41061; G05B 2219/41068; G05B 19/404; G05B 19/401; G05B 19/43; G01D 5/56; G01D 5/58; F16H 57/01; G01M 13/02
See application file for complete search history.

(56) References Cited

U.S. PATENT DOCUMENTS

| | | |
|---|---|---|
| 2,887,680 A | 5/1959 | Riggen |
| 8,265,779 B2 | 9/2012 | Hagglund |
| 10,634,379 B2 | 4/2020 | Mikulica et al. |
| 2006/0060078 A1 | 3/2006 | Deller et al. |
| 2014/0039666 A1* | 2/2014 | Kim .................. B23Q 5/56 700/174 |

(Continued)

FOREIGN PATENT DOCUMENTS

| | | |
|---|---|---|
| EP | 3078589 B1 | 1/2018 |
| WO | 2009104676 A1 | 8/2009 |

(Continued)

*Primary Examiner* — Jonathan M Dunlap
(74) *Attorney, Agent, or Firm* — Lorenz & Kopf LLP

(57) ABSTRACT

A system and method for measuring an amount of backlash in an actuator assembly that includes a housing assembly, an actuator, a drive source, an actuator position sensor, a drive source position sensor, and a controller. The controller is in operable communication with the drive source, the actuator position sensor, and the drive source position sensor, and is configured to selectively implement a built-in test that determines the amount of backlash in the actuator assembly.

18 Claims, 7 Drawing Sheets

(56) References Cited

U.S. PATENT DOCUMENTS

| | | |
|---|---|---|
| 2014/0062378 A1 | 3/2014 | Iwashita et al. |
| 2016/0129539 A1 | 5/2016 | Lin et al. |
| 2020/0158599 A1 | 5/2020 | Best |
| 2021/0049843 A1 | 2/2021 | Oh et al. |

FOREIGN PATENT DOCUMENTS

| | | | | |
|---|---|---|---|---|
| WO | 2016087891 A1 | 6/2016 | | |
| WO | WO-2021146578 A1 * | 7/2021 | ............. | F16H 57/00 |

* cited by examiner

SYSTEM AND METHOD FOR MEASURING THE AMOUNT OF BACKLASH IN AN ACTUATOR ASSEMBLY

TECHNICAL FIELD

The present disclosure generally relates to actuator assemblies, and more particularly relates to systems and methods for measuring the amount of backlash in actuator assemblies.

BACKGROUND

Actuators are used in myriad devices and systems. For example, many vehicles including, for example, aircraft, spacecraft, watercraft, and numerous other terrestrial and non-terrestrial vehicles, include one or more actuators to move various control surfaces or components. In many applications, such as, for example, aircraft flight surface control systems and thrust reverser actuation control systems, the actuators that are used may be subject to relatively severe environmental conditions, as well as relatively high magnitude shock and vibration. However, even normal environmental and operational conditions can lead to progressive degradation of the actuators, which in turn can cause unscheduled operation interruptions.

One of the most significant progressive degradations in actuators is backlash, which can, in some instances, result in sudden and unexpected failure. Unfortunately, backlash is often delimited by external loads or the actuator controller function, making it difficult to detect and monitor in-situ. Current approaches to detecting backlash have several limitations that prevent using them for regular backlash detection and monitoring. These limitations include: the necessity to remove the actuator from the aircraft (or other vehicle or system) to inspect it for presence of backlash; and/or the need for special tooling and fixtures to do the inspection. Therefore, the inspection can be effectively done only after actuator repair and overhaul or during the vehicle heavy maintenance checks.

Hence, there is a need for an effective solution for regular and in-situ monitoring of actuator backlash. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for measuring an amount of backlash in an actuator assembly includes a housing assembly, an actuator, a drive source, an actuator position sensor, a drive source position sensor, and a controller. The housing assembly has a retract end stop and an extend end stop mounted therein. The actuator is disposed at least partially in the housing. The actuator is coupled to receive a drive force and is configured, in response to the drive force, to move to an actuator position between and including (i) a fully-retracted position, in which the actuator contacts the retract end stop, and (ii) a fully-extended position, in which the actuator contacts the extend end stop. The drive source is coupled to receive actuator commands and is configured, upon receipt of the actuator commands, to supply the drive force to the actuator. The actuator position sensor is configured to sense an actuator position, and the drive source position sensor is configured to sense a drive source position. The controller is in operable communication with the drive source, the actuator position sensor, and the drive source position sensor, and is configured to selectively implement a built-in test during which the controller: (i) commands to the drive source to move the actuator to the fully-extended position, and then commands the drive source to move the actuator to a first predetermined position that is past the fully-extended position, (ii) while commanding the drive source to move the actuator to the first predetermined position, reads a first actuator position from the actuator position sensor and a first drive source position from the drive source position sensor, (iii) commands to the drive source to move the actuator to the fully-retracted position, and then commands the drive source to move the actuator to a second predetermined position that is past the fully-retracted position, (iv) while commanding the drive source to move the actuator to the second predetermined position, reads a second actuator position from the actuator position sensor and a second drive source position from the drive source position sensor, (v) determines a first travel distance from the first and second actuator positions, (vi) determines a second travel distance from the first and second drive source positions, and (vii) determines the amount of backlash from the first and second travel distances.

In another embodiment, method for measuring an amount of backlash in an actuator assembly includes commanding, with a controller, a drive source to move the actuator assembly to a fully-extended position, and then commanding, with the controller, the drive source to move the actuator assembly to a first predetermined position that is past the fully-extended position. While commanding the drive source to move the actuator assembly to the first predetermined position, reading, with the controller, a first actuator position from an actuator position sensor and a first drive source position from a drive source position sensor. With the controller, commanding the drive source to move the actuator assembly to a fully-retracted position, and then commanding, with the controller, the drive source to move the actuator to a second predetermined position that is past the fully-retracted position. While commanding the drive source to move the actuator to the second predetermined position, reading, with the controller, a second actuator position from the actuator position sensor and a second drive source position from the drive source position sensor. A first travel distance is determined from the first and second actuator positions. A second travel distance is determined from the first and second drive source positions. The amount of backlash is determined from the first and second travel distances.

In yet another embodiment, an actuator built-in test system for measuring an amount of backlash in an actuator assembly includes a controller that is in operable communication with an actuator position sensor, a drive source position sensor, and a drive source that is coupled to an actuator. The controller is configured to selectively implement a built-in test during which the controller: (i) commands to the drive source to move the actuator to a fully-extended position, and then commands the drive source to move the actuator to a first predetermined position that is past the fully-extended position, (ii) while commanding the drive source to move the actuator to the first predetermined position, reads a first actuator position from the actuator position sensor and a first drive source position from the drive source position sensor, (iii) commands to the drive source to move the actuator to a fully-retracted position, and then commands the drive source to move the actuator to a second predetermined position that is past the fully-retracted position, (iv) while commanding the drive source to move the actuator to the second predetermined position, reads a second actuator position from the actuator position sensor and a second drive source position from the drive source position sensor, (v) determines a first travel distance from the first and second actuator positions, (vi) determines a second travel distance from the first and second drive source positions, and (vii) determines the amount of backlash from the first and second travel distances.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
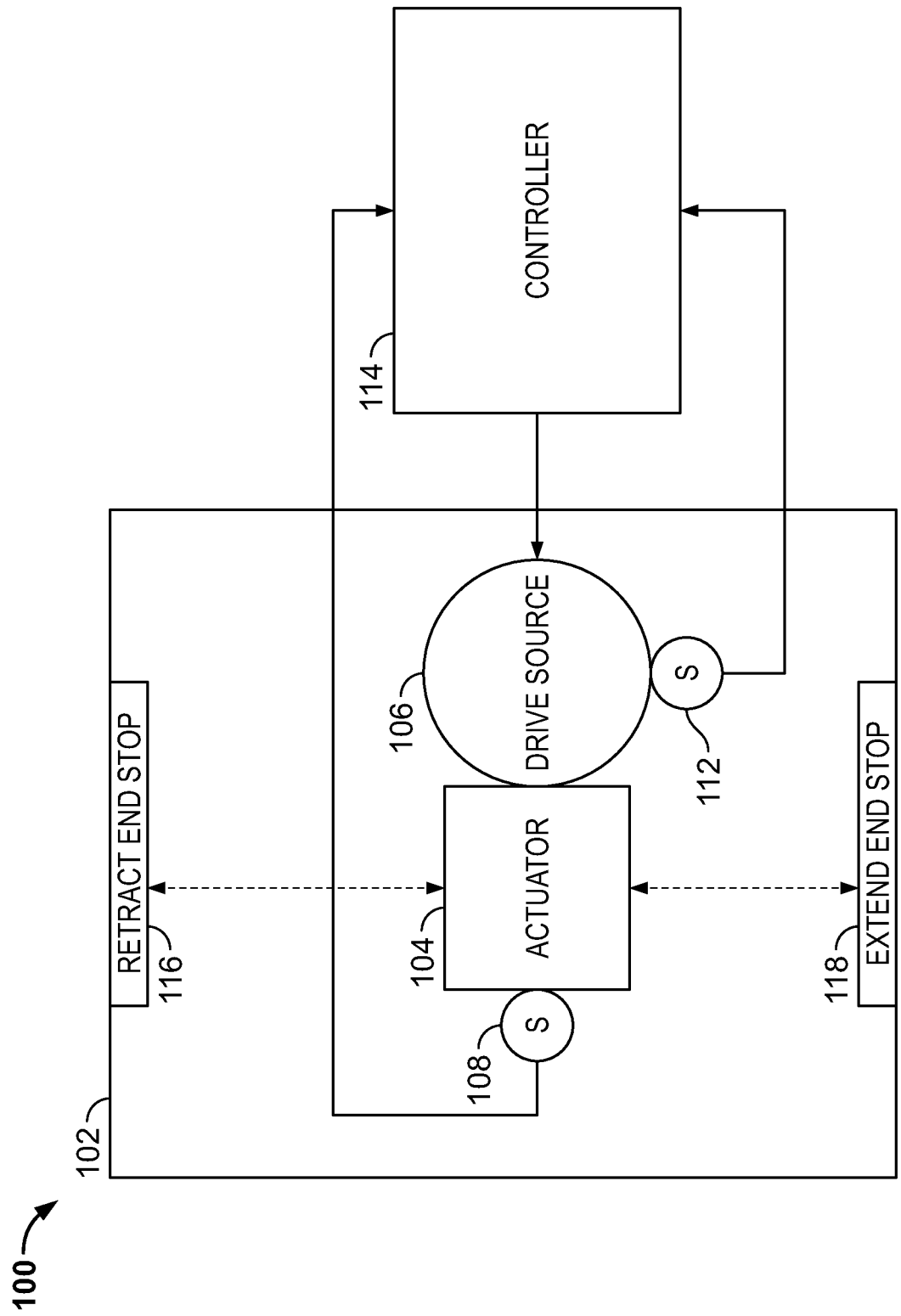
FIG. 1 depicts a simplified functional block diagram of a system for measuring an amount of backlash in an actuator assembly.

Referring to FIG. 1, a simplified functional block diagram of a system for measuring an amount of backlash in an actuator assembly is depicted. The system 100 includes a housing assembly 102, an actuator 104, a drive source 106, an actuator position sensor 108, a drive source position sensor 112, and a controller 114. The housing 102 includes at least a retract end stop 116 mounted therein and an extend end stop 118 mounted therein.

The actuator 104 is disposed at least partially in the housing 102 and is coupled to receive a drive force from the drive source 106. The actuator 104 is configured, in response to the drive force, to move, as illustrated using dotted lines in FIG. 1, to an actuator position between and including a fully-retracted position and a fully-extended position. In the fully-retracted position, the actuator 104 contacts the retract end stop 116, and in the fully-extended position, the actuator 104 contacts the extend end stop 118. The drive source 106 is coupled to receive actuator commands and is configured, upon receipt of the actuator commands, to supply the drive force to the actuator 104.

Before proceeding further, it will be appreciated that the actuator 104 and the drive source 106 may be variously configured and implemented. For example, the actuator 104 may be implemented using any one of numerous types of linear actuators or rotary actuators. Moreover, the actuator 104 may be implemented as an electromechanical actuator, a hydraulic actuator, or a pneumatic actuator. As may be appreciated, when the actuator 104 is an electromechanical actuator, the drive source 106 is preferably an electric motor, when the actuator 104 is a hydraulic actuator, the drive source 106 is preferably hydraulic motor (or other hydraulically powered drive source), and when the actuator 104 is a pneumatic actuator, the drive source 106 is preferably a pneumatic motor (or other pneumatically powered drive source).

The actuator position sensor 108 is configured to sense an actuator position and to supply an actuator position signal indicative thereof, and the drive source position sensor 112 is configured to sense a drive source position and supply a drive source position signal representative thereof. It will be appreciated that the actuator position sensor 108 and the drive source position sensor 112 may each be implemented using any one of numerous known types of position sensors. For example, these sensors 108, 112 may be implemented using any one of numerous suitable linear or rotary position sensors, for example optical sensors, capacitive sensors, resistive sensors, inductive sensors, or semiconductor sensors, just to name a few.

The controller 114 is in operable communication with the drive source 106, the actuator position sensor 108, and the drive source position sensor 112. The controller 114 is configured to command the movement of the actuator 104 during normal operations using any one of numerous known control techniques. The controller 114 is also configured to selectively implement a built-in test of the actuator 104. More specifically, the controller 114 is configured to implement a built-in test that measures the amount of backlash in the actuator 104. This built-in test will be described momentarily. Before doing so, however, a brief description of a system 200 that includes an electromechanical actuator will be described.

Figure 2:
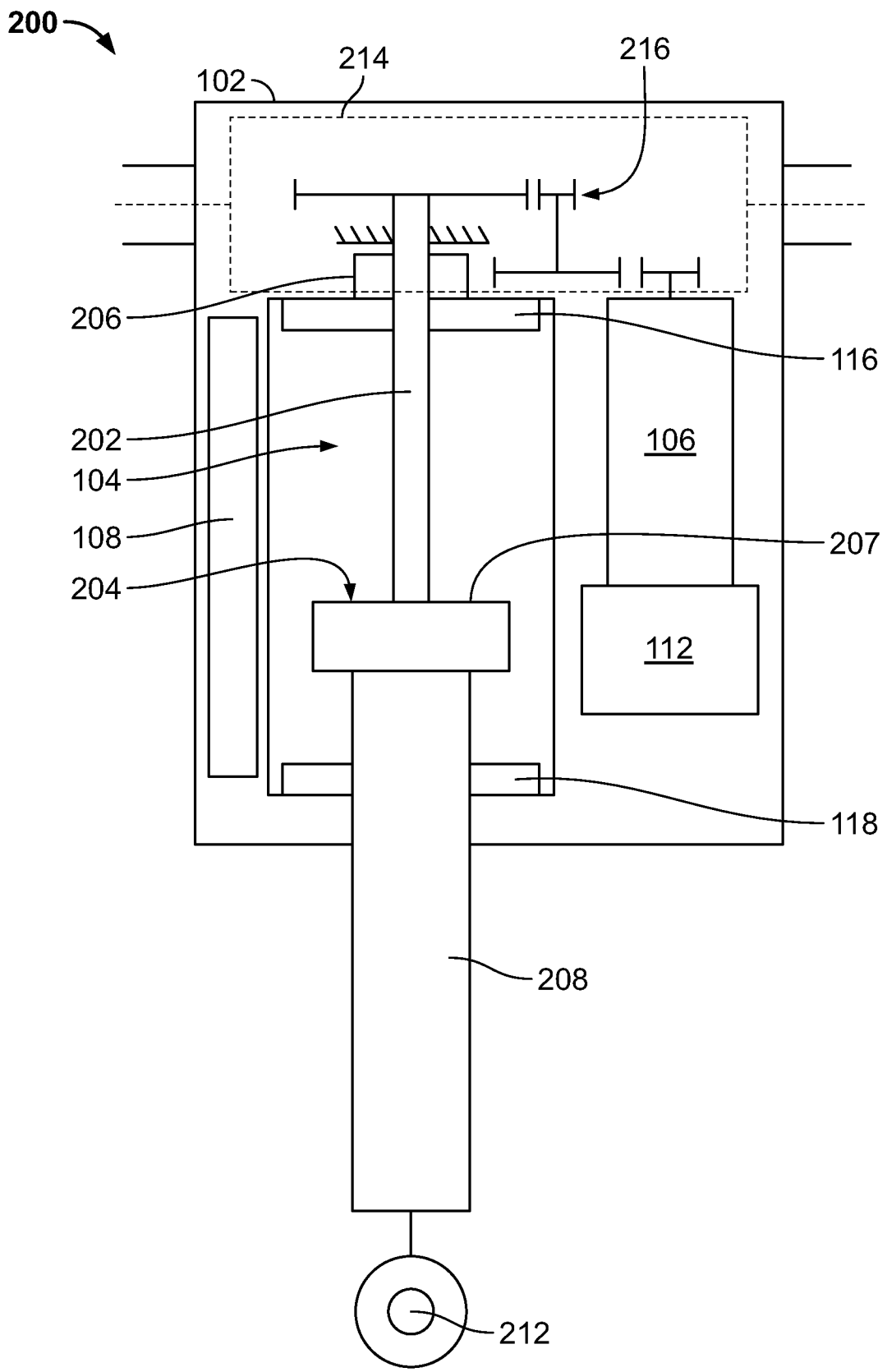
FIG. 2 depicts an embodiment of an electromechanical actuator that may be used in the system of FIG. 1.

As depicted in FIG. 2, the system 200 depicted therein includes the same devices and components as described above with respect to FIG. 1. That is, it includes the housing assembly 102, with the retract and extend end stops 116, 118, the actuator 104, the drive source 106, the actuator position sensor 108, and the drive source position sensor 112 (for clarity, the controller 114 is not depicted in FIG. 2). However, in this system 200 the actuator 104 is configured as a linear electromechanical actuator, and the drive source 106 is implemented using an electric motor. With this configuration, the drive force supplied by the drive source 106 is a rotational drive force, and the actuator 104 includes an actuator shaft 202 and an actuation member 204.

The actuator shaft 202 is rotationally mounted in the housing assembly 102, preferably via a bearing assembly 206. The actuator shaft 202 is coupled to receive the rotational drive force supplied from the drive source 106 and is configured, upon receipt thereof, to rotate. The actuation member 204 is mounted on the actuator shaft 202 and is configured to translate in response to rotation of the actuator shaft 202. As may be appreciated, the actuator shaft 202 may be configured as a lead screw, and the actuation member 204 may be configured as a ball nut 207 having an output member 208 coupled thereto. As FIG. 2 also depicts, a spherical bearing 212 may also, at least in some embodiments, have a spherical bearing coupled thereto.

The depicted system 200 also includes a gear box 214, which is mounted in the housing assembly 102. The gear box 214 is disposed between the drive source 106 and the actuator shaft 202 and has a gear assembly 216 disposed therein. The gear assembly 216, which may be implemented using any one of numerous known gear assemblies, transfers the rotational drive force from the drive source 106 to the actuator shaft 202. As FIG. 2 also depicts, the bearing assembly 206, at least in the depicted embodiment, is mounted within the gear box 214.

Figure 3:
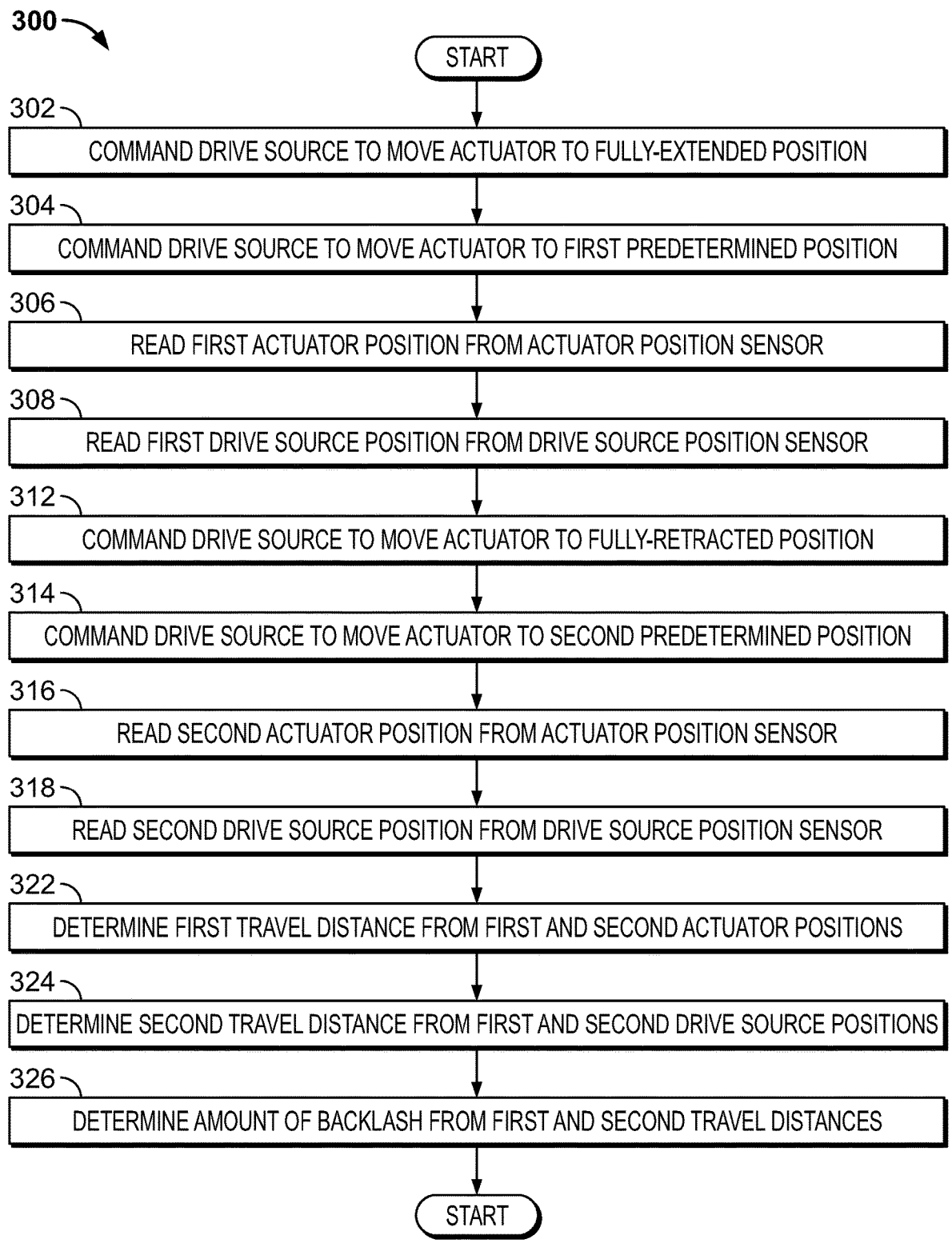
FIG. 3 depicts a built-in test, in flowchart form, that may be implemented in the system of FIG. 1.

As noted above, the controller 114 is configured to implement a built-in test that measures the amount of backlash in the actuator 104. The built-in test, which is depicted in flowchart form in FIG. 3, will now be described. For illustrative purposes, the following description of built-in test 300 may refer to elements mentioned above in connection with FIGS. 1 and 2. In practice, portions of method 300 may be performed by different components of the described system 100. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 if the intended overall functionality remains intact.

Figure 4:
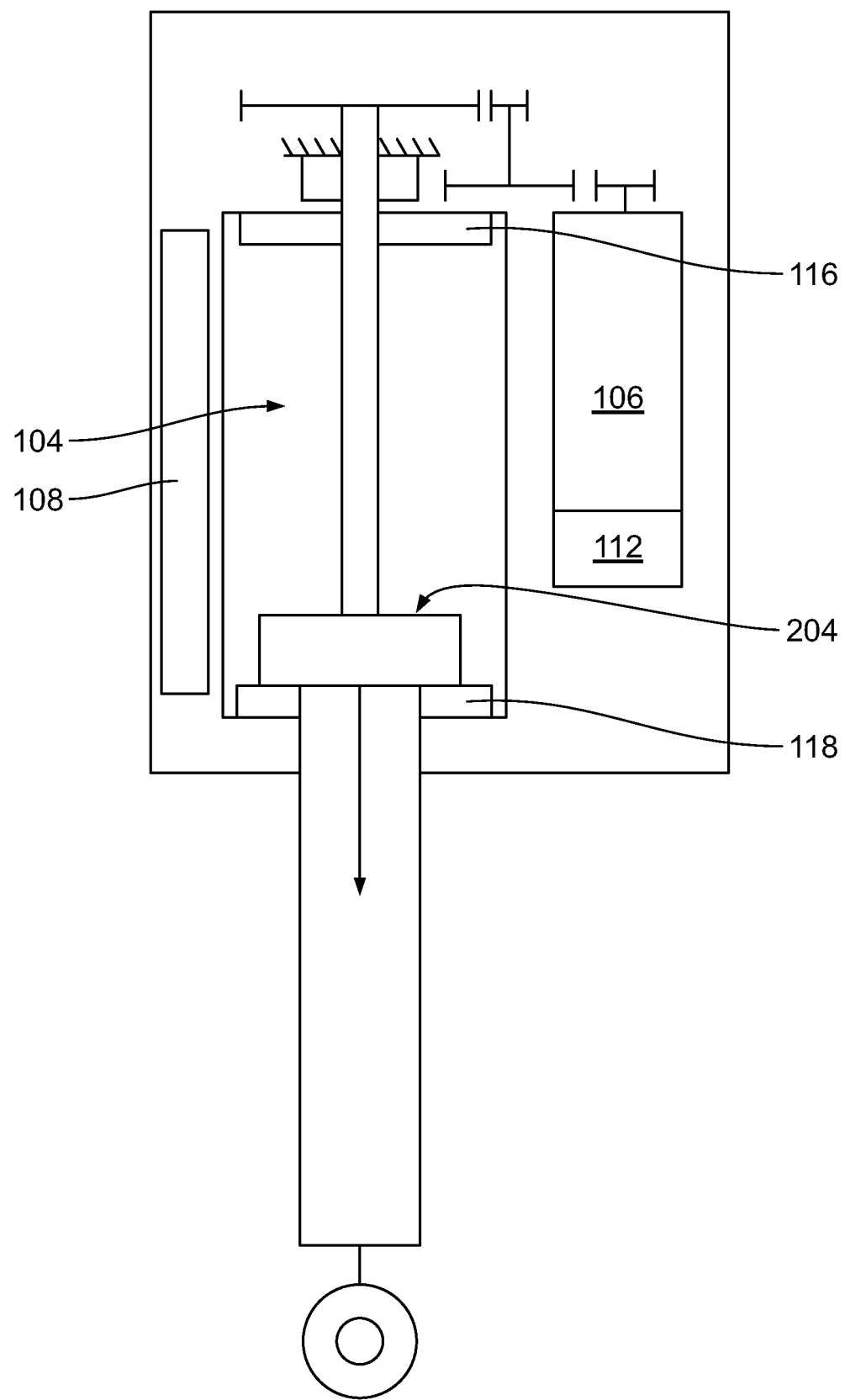
FIGS. 4 and 5 depict the actuator of FIG. 2 in the fully-extended and fully-retracted positions, respectively.

The test 300 begins and the controller 114 supplies commands to the drive source 106 to move the actuator 104 to the fully-extended position (302). As previously mentioned, and as shown in FIG. 4, in the fully-extended position, the actuation member 204 contacts the extend end stop 118. With the actuator 104 in the fully-extended position, the controller 114 then commands the drive source 106 to move the actuator 104 to a first predetermined position that is past the fully-extended position (304). The actuator 104 will, in response, apply a controllable force to, and attempt to move past, the extend end stop 118. Then, while commanding the drive source 106 to move the actuator 104 to the first predetermined position, the controller 114 reads a first actuator position from the actuator position sensor 108 (306) and a first drive source position from the drive source position sensor 112 (308).

Figure 5:
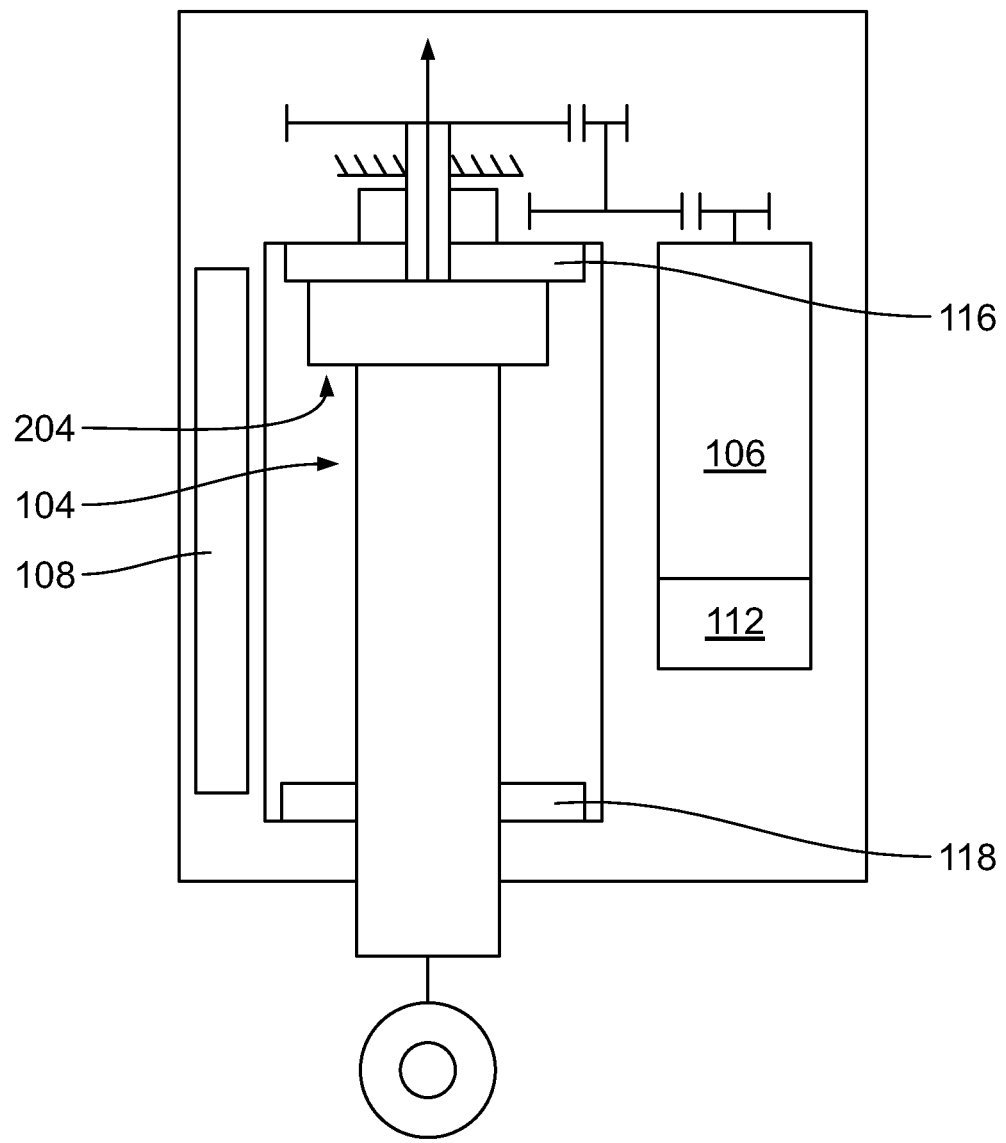

After reading the first actuator position and the first drive source positions, the controller 114 commands the drive source 106 to move the actuator 104 to the fully-retracted position (312). As previously mentioned, and as shown in FIG. 5, in the fully-retracted position, the actuation member 204 contacts the retract end stop 116. With the actuator 104 in the fully-retracted position, the controller 114 then commands the drive source 106 to move the actuator 104 to a second predetermined position that is past the fully-retracted position (314). The actuator 104 will, in response, apply a controllable force to, and attempt to move past, the retract end stop 116. Then, while commanding the drive source 106 to move the actuator 104 to the second predetermined position, the controller 114 reads a second actuator position from the actuator position sensor 108 (316) and a second drive source position from the drive source position sensor 112 (318).

Figure 6:
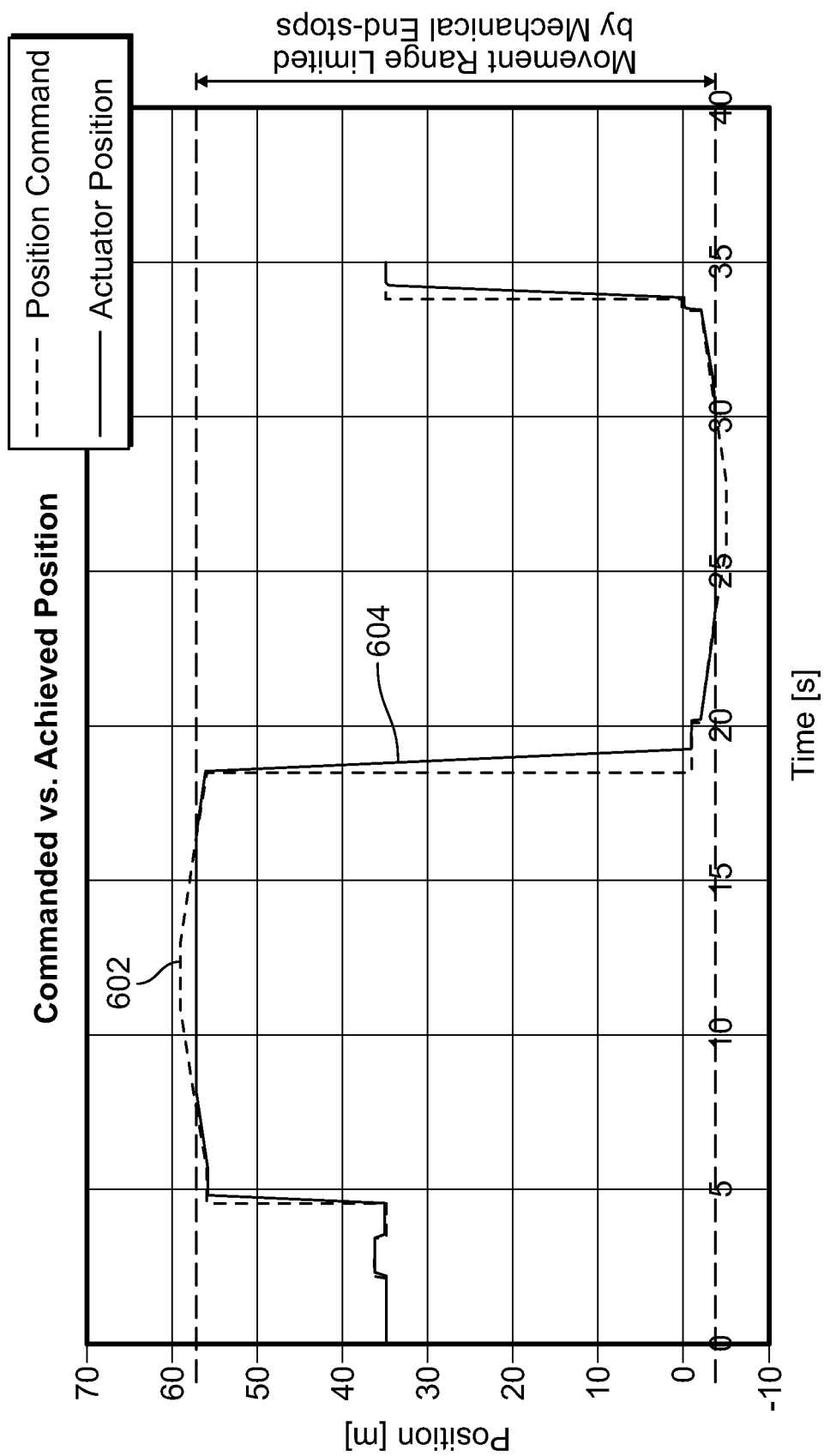
FIG. 6 graphically illustrates position commands and actuator positions during the built-in test of FIG. 3.

It will be appreciated that the first and second predetermined positions may vary, but in one particular embodiment, the first predetermined position is, for example, 1.5 mm beyond the fully-extended position and the second predetermined position is, for example, 1.5 mm beyond the fully-retracted position. However, the position beyond the end stops 116, 118 shall be adjusted with respect to the expected maximal measured backlash. Regardless of what the specific first and second predetermined positions are, because the actuator 104 is contacting the extend and retract end stops 116, 118 in the fully-extended and fully-retracted positions, respectively, the actuator positions sensed while the controller 114 is commanding the drive source 106 to move the actuator 104 to the first and second predetermined positions will be the same as the actuator positions sensed in the fully-extended and fully-retracted positions, respectively. This is depicted in FIG. 6, which graphically illustrates the positions the controller 114 is commanding 602 and the sensed actuator positions 604.

Returning to FIG. 3, after commanding the drive source 106 to move the actuator 104 as just described, the controller 114 determines a first travel distance from the first and second actuator positions (322), and a second travel distance from the first and second drive source positions (324). The controller 314 then determines the amount of backlash from the first and second travel distances (326).

Figure 7:
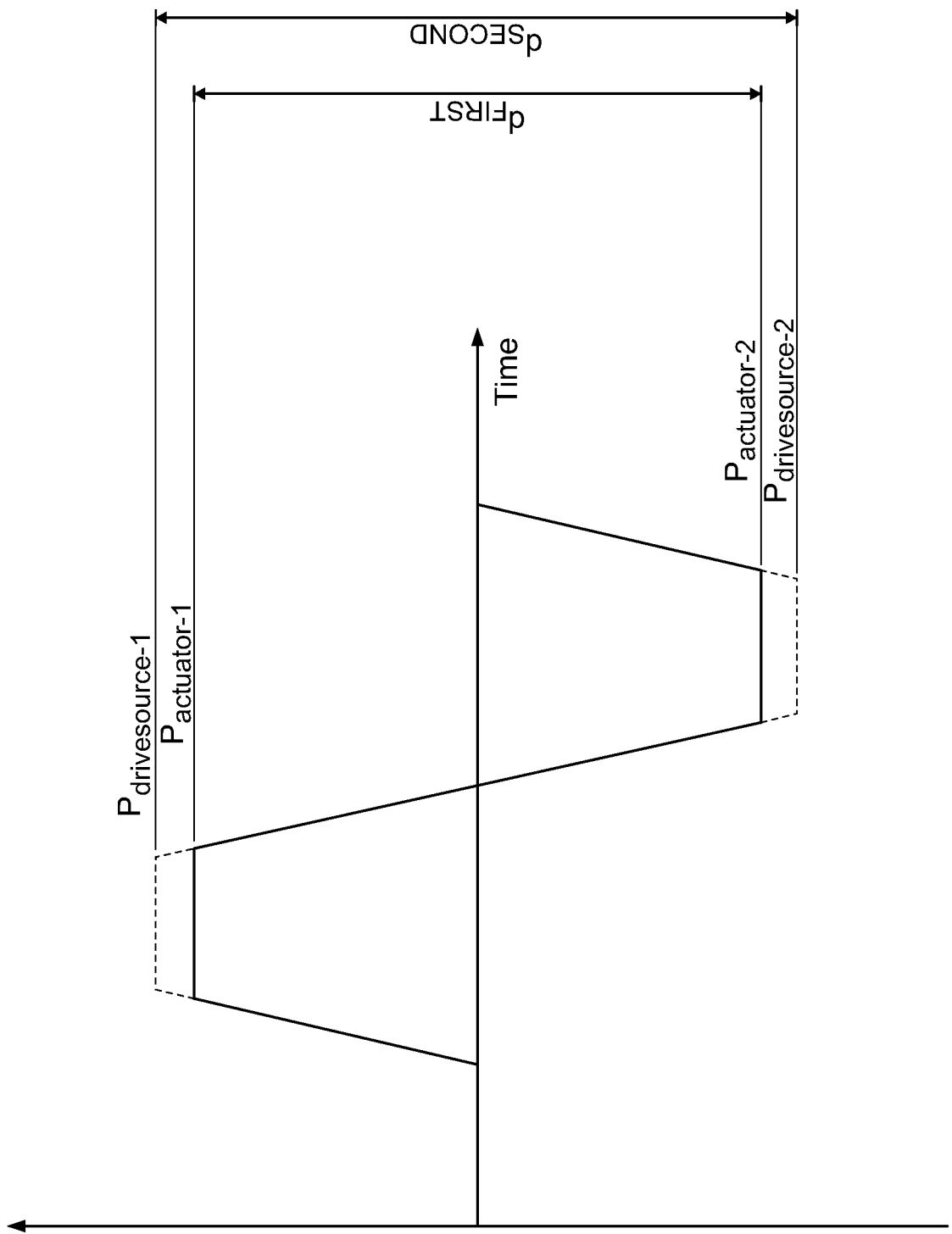
FIG. 7 graphically depicts the travel distances sensed and determined during the built-in test.

More specifically, as indicated below and as depicted in FIG. 7, the first travel distance ($d_{FIRST}$) is determined by subtracting the second actuator position ($P_{ACTUATOR\_2}$) from the first actuator position ($P_{ACTUATOR\_1}$), and the second travel distance ($d_{SECOND}$) is determined by subtracting the second drive source position ($P_{DRIVE\_SOURCE\_2}$) from the first drive source position ($P_{DRIVE\_SOURCE\_}$):

$$d_{FIRST} = P_{ACTUATOR\_1} - P_{ACTUATOR\_2} \quad \text{(Equation 1)}$$

$$d_{SECOND} = P_{DRIVE\ SOURCE\_1} - P_{DRIVE\ SOURCE\_2} \quad \text{(Equation 2)}$$

When backlash initiates, and perhaps grows, the drive source 106 compensates for this backlash. As a result, the second travel distance, which is the difference between first and second drive source positions, will increase, while the first travel distance will remain the same. Thus, the amount of backlash (BACKLASH) is more specifically determined by subtracting the first travel distance $d_{FIRST}$ from the second travel distance $d_{SECOND}$, as shown below:

$$\text{BACKLASH} = d_{SECOND} - d_{FIRST} \quad \text{(Equation 3)}.$$

The system and method described herein is an effect method of detecting backlash in various actuator components. For example, in the example actuator 104 depicted in FIG. 2, backlash can be detected in the bearing assembly 206, the gear box 214, actuator shaft 202, and the nut 207. The system and method do not require removal of the actuator from the aircraft (or other vehicle or system) to inspect it for presence of backlash, it does not require special tooling and fixtures, and does not have to be done after actuator repair and overhaul or during heavy maintenance checks.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for measuring an amount of backlash in an actuator assembly, comprising:
   a housing assembly having a retract end stop and an extend end stop mounted therein;
   an actuator disposed at least partially in the housing, the actuator coupled to receive a drive force and configured, in response to the drive force, to move to an actuator position between and including (i) a fully-retracted position, in which the actuator contacts the retract end stop, and (ii) a fully-extended position, in which the actuator contacts the extend end stop;
   a drive source coupled to receive actuator commands and configured, upon receipt of the actuator commands, to supply the drive force to the actuator;
   an actuator position sensor configured to sense an actuator position;
   a drive source position sensor configured to sense a drive source position; and
   a controller in operable communication with the drive source, the actuator position sensor, and the drive source position sensor, the controller configured to selectively implement a built-in test during which the controller:
   (i) commands to the drive source to move the actuator to the fully-extended position, and then commands the drive source to move the actuator to a first predetermined position that is past the fully-extended position,
   (ii) while commanding the drive source to move the actuator to the first predetermined position, reads a first actuator position from the actuator position sensor and a first drive source position from the drive source position sensor,
   (iii) commands to the drive source to move the actuator to the fully-retracted position, and then commands the drive source to move the actuator to a second predetermined position that is past the fully-retracted position,
   (iv) while commanding the drive source to move the actuator to the second predetermined position, reads a second actuator position from the actuator position sensor and a second drive source position from the drive source position sensor,
   (v) determines a first travel distance from the first and second actuator positions,
   (vi) determines a second travel distance from the first and second drive source positions, and
   (vii) determines the amount of backlash from the first and second travel distances.

2. The system of claim 1, wherein:
   the first travel distance is determined by subtracting the second actuator position from the first actuator position; and
   the second travel distance is determined by subtracting the second drive source position from the first drive source position.

3. The system of claim 1, wherein the amount of backlash is determined by subtracting the first travel distance from the second travel distance.

4. The system of claim 1, wherein the drive force supplied by the drive source is a rotational drive force, and wherein the actuator comprises:
   an actuator shaft rotationally mounted in the housing assembly, the actuator shaft adapted to receive the rotational drive force and configured, upon receipt thereof, to rotate; and
   an actuation member mounted on the actuator shaft and is configured to translate in response to rotation of the actuator shaft.

5. The system of claim 4, further comprising:
   a gear box mounted in the housing assembly and disposed between the drive source and the actuator shaft, the gear box having a gear assembly disposed therein that transfers the rotational drive force from the drive source to the actuator shaft.

6. The system of claim 5, further comprising:
   a bearing assembly mounted within the gear box and having the actuator shaft mounted thereon.

7. The system of claim 1, wherein:
   the actuator comprises an electromechanical actuator; and
   the drive source comprises an electric motor.

8. The system of claim 1, wherein the actuator is selected from the group consisting of a linear actuator and a rotary actuator.

9. The system of claim 1, wherein the actuator is selected from the group consisting of an electromechanical actuator, a hydraulic actuator, and a pneumatic actuator.

10. A method for measuring an amount of backlash in an actuator assembly, comprising the steps of:
    commanding, with a controller, a drive source to move the actuator assembly to a fully-extended position;
    commanding, with the controller, the drive source to move the actuator assembly to a first predetermined position that is past the fully-extended position;
    while commanding the drive source to move the actuator assembly to the first predetermined position, reading, with the controller, a first actuator position from an actuator position sensor and a first drive source position from a drive source position sensor;
    commanding, with the controller, the drive source to move the actuator assembly to a fully-retracted position;
    commanding, with the controller, the drive source to move the actuator to a second predetermined position that is past the fully-retracted position;
    while commanding the drive source to move the actuator to the second predetermined position, reading, with the controller, a second actuator position from the actuator position sensor and a second drive source position from the drive source position sensor;

determining, with the controller, a first travel distance from the first and second actuator positions;

determining, with the controller, a second travel distance from the first and second drive source positions; and determining, with the controller, the amount of backlash from the first and second travel distances.

11. The method of claim 10, wherein:
the first travel distance is determined by subtracting the second actuator position from the first actuator position; and
the second travel distance is determined by subtracting the second drive source position from the first drive source position.

12. The method of claim 10, wherein the amount of backlash is determined by subtracting the first travel distance from the second travel distance.

13. The method of claim 10, wherein:
the actuator comprises an electromechanical actuator; and
the drive source comprises an electric motor.

14. The method of claim 10, wherein the actuator is selected from the group consisting of a linear actuator and a rotary actuator.

15. The method of claim 10, wherein the actuator is selected from the group consisting of an electromechanical actuator, a hydraulic actuator, and a pneumatic actuator.

16. An actuator built-in test system for measuring an amount of backlash in an actuator assembly, comprising:
a controller in operable communication with an actuator position sensor, a drive source position sensor, and a drive source that is coupled to an actuator, the controller configured to selectively implement a built-in test during which the controller:
(i) commands to the drive source to move the actuator to a fully-extended position, and then commands the drive source to move the actuator to a first predetermined position that is past the fully-extended position,
(ii) while commanding the drive source to move the actuator to the first predetermined position, reads a first actuator position from the actuator position sensor and a first drive source position from the drive source position sensor,
(iii) commands to the drive source to move the actuator to a fully-retracted position, and then commands the drive source to move the actuator to a second predetermined position that is past the fully-retracted position,
(iv) while commanding the drive source to move the actuator to the second predetermined position, reads a second actuator position from the actuator position sensor and a second drive source position from the drive source position sensor,
(v) determines a first travel distance from the first and second actuator positions;
(vi) determines a second travel distance from the first and second drive source positions, and
(vii) determines the amount of backlash from the first and second travel distances.

17. The system of claim 16, wherein:
the first travel distance is determined by subtracting the second actuation member position from the first actuation member position; and
the second travel distance is determined by subtracting the second drive source position from the first drive source position.

18. The system of claim 16, wherein the amount of backlash is determined by subtracting the first travel distance from the second travel distance.

* * * * *